United States Patent
Liu

(10) Patent No.: US 7,879,930 B2
(45) Date of Patent: Feb. 1, 2011

(54) COLORED OXYGEN SCAVENGING POLYMERS

(75) Inventor: Zhenguo Liu, Greer, SC (US)

(73) Assignee: INVISTA North America S.a r.l., Wilmington, DE (US)

( * ) Notice: Subject to any disclaimer, the term of this patent is extended or adjusted under 35 U.S.C. 154(b) by 922 days.

(21) Appl. No.: 11/659,053

(22) PCT Filed: Aug. 17, 2005

(86) PCT No.: PCT/US2005/029297

§ 371 (c)(1),
(2), (4) Date: Jan. 31, 2007

(87) PCT Pub. No.: WO2006/023583

PCT Pub. Date: Mar. 2, 2006

(65) Prior Publication Data

US 2009/0030115 A1    Jan. 29, 2009

Related U.S. Application Data

(60) Provisional application No. 60/602,272, filed on Aug. 17, 2004.

(51) Int. Cl.
C08L 67/00 (2006.01)
C08L 77/00 (2006.01)
B32B 27/34 (2006.01)
B32B 27/36 (2006.01)

(52) U.S. Cl. .......... 524/87; 524/157; 524/186; 524/190; 524/356; 524/357; 524/358; 524/513; 524/514; 524/515; 524/527; 524/538; 524/539; 524/601

(58) Field of Classification Search ........ 524/87, 524/157, 186, 190, 356, 357, 358, 513, 514, 524/515, 527, 538, 539, 601
See application file for complete search history.

(56) References Cited

U.S. PATENT DOCUMENTS

| | | | |
|---|---|---|---|
| 5,021,515 A | 6/1991 | Cochran et al. | |
| 5,281,360 A | 1/1994 | Hong et al. | |
| 5,314,987 A | 5/1994 | Kim | |
| 5,340,884 A | 8/1994 | Mills et al. | |
| 5,639,815 A | 6/1997 | Cochran et al. | |
| 5,866,649 A | 2/1999 | Hong et al. | |
| 5,955,527 A | 9/1999 | Cochran et al. | |
| 6,083,585 A | 7/2000 | Cahill et al. | |
| 6,288,161 B1 | 9/2001 | Kim et al. | |
| 6,365,247 B1 | 4/2002 | Cahill et al. | |
| 6,444,283 B1 | 9/2002 | Turner et al. | |
| 2002/0063238 A1 | 5/2002 | Cochran et al. | |
| 2002/0173591 A1 | 11/2002 | Chisholm et al. | |
| 2003/0031815 A1 | 2/2003 | Schiraldi et al. | |

FOREIGN PATENT DOCUMENTS

| EP | 0301719 | 2/1989 |
|---|---|---|
| WO | WO93/23474 | 11/1993 |
| WO | 95/06677 | 3/1995 |
| WO | WO 98/012244 | 3/1998 |
| WO | WO 99/048963 | 9/1999 |

OTHER PUBLICATIONS

Sekelik et al., Journal of Polymer Science Part B: Polymer Physics, 1999, vol. 37, pp. 847-857.
Qureshi et al., Journal of Polymer Science Part B: Polymer Physics, 2000, vol. 38, pp. 1679-1686.
Polyakova et al., Journal of Polymer Science Part B: Polymer Physics, 2001, vol. 39, pp. 1889-1899.
INVISTA press release of Jul. 20, 2004 (D12).
PolyShieldTM presentation PET World Congress at Drinktec Sep. 12, 2005 (D14).
Slide presentations—Nova Pack Europe 2004, entitled "Beer in PolyShield—The Monolayer Miracle" (D20).
Presentation—Nova-Pack Europe 2003 by DIPOL Chemical International entitled "Prospects for PET Barrier Packaging for Beer in Eastern European Market" (D22).
Summary from Plastics Technology of Sep. 1, 2003 entitled "Monolayer PET Bottles Emerge in Barrier Uses" (D24).
Document entitled "International Events" which presents the date of Nove-Pack Europe 2004 as being Oct. 18/19, 2004 (D29).

*Primary Examiner*—Ana L Woodward
(74) *Attorney, Agent, or Firm*—Craig M. Sterner

(57) ABSTRACT

The present invention relates to a melt blend of a base polymer, an oxidizable organic polymer, a transition metal salt catalyst and a colorant that does not completely deactivate the catalyzed oxidation. A preferred colorant, yields in an article made from the polymer melt blend a Catalyst Deactivation Factor (CDF) of less than about 0.25, preferably less than 0.15, more preferably less than 0.1, and most preferred less than 0.05. The present invention also comprises a colored monolayer article having the described CDF, such as a film, thermoformed tray, or blow molded container, that has active oxygen scavenging properties. The colorant, after melt blending a base polymer, an oxidizable organic polymer, a transition metal catalyst, does not increase the binding energy of the transition metal catalyst ion by more than 1 eV.

15 Claims, No Drawings

COLORED OXYGEN SCAVENGING POLYMERS

BACKGROUND

1) Field of the Invention

This invention relates to colored oxygen scavenging polymers and articles made from such polymers. In particular it relates to polymer blends containing a base polymer, an oxidizable organic polymer, a transition metal catalyst, and a colorant. The colorant is selected from a group of colorants that do not completely deactivate the transition metal catalyst. A preferred colorant, yields in an article made from the melt polymer blend, a Catalyst Deactivation Factor (CDF) of less than about 0.25, preferably less than 0.15, more preferably less than 0.1, and most preferred less than 0.05. The present invention also comprises a colored monolayer article made from such polymer blends having the described CDF, such as a film, thermoformed tray, or blow molded container, that has active oxygen scavenging properties.

2) Prior Art

Typical polymers used in making film, thermoformed trays, or blow molded containers, are primarily based on polyester due to its physical properties. Suitable polyesters can be homopolymers such as polyethylene terephthalate (PET), polyethylene naphthalate (PEN), or copolymers of either or both. For blow molded containers, polyethylene terephthalate isophthalate copolyester (PET/IP) is particularly useful.

Oxygen scavenging polymers are well known and are especially useful in the food packaging business. It is known that oxygen can have an effect on the odor and taste of packaged food thereby shortening the shelf life of the food. Oxygen scavenging packaging materials, on the other hand, react with oxygen that is in the process of traversing the packaging barrier. Thus the oxygen scavenging packaging material reduces or eliminates the odor and/or undesirable taste of food or beverages excessively exposed to oxygen.

Typical oxygen scavenging compounds are oxidizable organic polymer molecules containing allylic positions such as polybutadiene based polymers, or polyethylene/cyclohexene copolymers, or containing benzylic positions such as m-xylylamine-based polyamides, or mixtures of these. The use of oxidizable organic polymers by themselves results in a very slow oxidative process, but such polymers lack the desired physical properties of PET, for example, and are very costly compared with PET. The incorporation of oxidation catalyst into the oxidizable polymer solves this problem.

With respect to the oxidizable organic polymers mentioned earlier, poly(m-xylylene adipamide) (known commercially as MXD6) is widely known. Additionally, the prior art discloses that the oxidizable organic polymers need a transition metal catalysts to make it actively scavenge oxygen. The most common transition catalyst described by the prior art is a cobalt salt.

PCT Patent Application WO 98/12244 in the name of inventors Cahill et al. and assigned to Amoco Corporation discloses an oxygen scavenging composition wherein the critical oxidizable organic polymer is polybutadiene and the catalyst for the oxidizable organic polymer is transition metal salts or other compounds. This application discloses the usefulness of such a composition as a blend with polymers for packaging films and containers for the food and beverage industry.

PCT Patent Application WO 99/48963 in the name of Ching et al. and assigned to Chevron Chemical Company discloses an oxygen scavenging composition including a polymer or oligomer having at least one cyclohexene group or functionality. This application also discloses the use of transition elements as a catalyst to activate the oxygen scavenging composition. The transition metal catalysts are employed in the form of salts and other compositions. This reference also notes that cobalt, a transition metal catalyst, is preferred.

The use of a transition metal catalyst to promote oxygen scavenging in polyamide multilayer containers, and blends with polyethylene terephthalate (PET), has been disclosed in the following patents, for example.

U.S. Pat. Nos. 5,021,515, 5,639,815 and 5,955,527 to Cochran et al. disclose the use of a cobalt salt as the preferred transition metal catalyst and poly(m-xylylene adipamide) (MXD6) as the preferred oxidizable organic polymer.

U.S. Pat. Nos. 5,281,360 and 5,866,649 to Hong, and U.S. Pat. No. 6,288,161 to Kim also discloses blends of MXD6 with PET and a cobalt salt catalyst.

Until recently these oxidizable organic polymers have been used as an inner layer in multilayer films, thermoformed trays or blow molded containers. For colored articles, such as green, blue or amber bottles, the colorant is mixed in the non-scavenging outer and inner layers. In such multilayer articles there is no reaction between the colorant and the transition metal catalyst contained in the oxygen scavenging layer. There is a need for colored monolayer films, sheets and containers to reduce the cost of multilayer processes.

It is generally accepted that the oxidation of polymers involves a free radical reaction with the formation of hydroperoxides. Transition metal ions catalyze the decomposition of hydroperoxides to radical species that greatly accelerate the rate of oxidation and thus the rate of oxygen scavenging.

Surprising it has been found that certain colorants deactivate the catalyst, after melt blending and thereafter (such as in an article), making them less effective as a catalyst. Thus only certain colorants can be used for monolayer oxygen scavenging articles since the colorant is intimately mixed in a melt phase with the transition metal catalyst, unlike prior multilayer film, thermoformed trays, or blow molded containers.

SUMMARY OF THE INVENTION

The present invention relates to the use of certain colorants that do not completely deactivate the catalyst in monolayer active oxygen scavenging melt blended polymeric systems. In the broadest sense the present invention comprises a blend of a base polymer, an oxidizable organic polymer, a transition metal catalyst, and a colorant that does not completely deactivate the catalyst after melt blending. Optionally a compatibilizer can be included in the blend.

The broadest scope of the present invention also comprises a colored monolayer article, such as a film, thermoformed tray, or blow molded container, that has active oxygen scavenging properties.

The broadest scope of the present invention also comprises an article made from a melt blended polymer resin comprising a base polymer, an oxidizable organic polymer, a transition metal catalyst, and a colorant that has a Color Deactivation Factor of less than about 0.25.

The broadest scope of the present invention also comprises a melt blended polymer resin comprising a base polymer, an oxidizable organic polymer, a transition metal catalyst, and a colorant that does not increase the binding energy of the transition metal catalyst ion by more than 1 eV.

DETAILED DESCRIPTION OF THE INVENTION

Melt blended compositions or polymer resins of this invention comprise: a base polymer, an oxidizable organic polymer, a transition metal catalyst, a colorant that does not deactivate the catalyst, and optionally a compatibilizer.

The base polymers used for packaging include, but are not limited to, polyethylene such as, for example, low density polyethylene, very low density polyethylene, ultra-low density polyethylene, high density polyethylene, and linear low density polyethylene; polyesters such as, for example, (PET), (PEN) and their copolymers such as PET/IP; polyvinyl chloride (PVC); polyvinylidene chloride (PVDC); and ethylene copolymers such as ethylene/vinyl acetate copolymer, ethylene/alkyl (meth)acrylate copolymers, ethylene/(meth)acrylic acid copolymers, and ionomers. Blends of different base polymers also can be used.

The preferred base polymer is polyester, and in particular PET and its copolymers. Generally polyesters can be prepared by one of two processes, namely: (1) the ester process and (2) the acid process. The ester process is where a dicarboxylic ester (such as dimethyl terephthalate) is reacted with ethylene glycol or other diol in an ester interchange reaction. Because the reaction is reversible, it is generally necessary to remove the alcohol (methanol when dimethyl terephthalate is employed) to completely convert the raw materials into monomers. Certain catalysts are well known for use in the ester interchange reaction. In the past, catalytic activity was sequestered by introducing a phosphorus compound, for example polyphosphoric acid, at the end of the ester interchange reaction. Primarily the ester interchange catalyst was sequestered to prevent yellowness from occurring in the polymer.

Then the monomer undergoes polycondensation and the catalyst employed in this reaction is generally an antimony, germanium, or titanium compound, or a mixture of these.

In the second method for making polyester, an acid (such as terephthalic acid) is reacted with a diol (such as ethylene glycol) by a direct esterification reaction producing monomer and water. This reaction is also reversible like the ester process and thus to drive the reaction to completion the water must be removed. The direct esterification step does not require a catalyst. The monomer then undergoes polycondensation to form polyester just as in the ester process, and the catalyst and conditions employed are generally the same as those for the ester process.

The temperatures, pressures, and associated equipment with the ester or acid process are well known to those skilled in the art. For most packaging applications this melt phase polyester is cooled and further polymerized to a higher molecular weight by a solid state polymerization.

In summary, in the ester process there are two steps, namely: (1) an ester interchange, and (2) polycondensation. In the acid process there are also two steps, namely: (1) direct esterification, and (2) polycondensation. Solid state polymerization is often used to increase the molecular weight.

Suitable polyesters are produced from the reaction of a diacid or diester component comprising at least 65 mol-% terephthalic acid or $C_1$-$C_4$ dialkylterephthalate, preferably at least 70 mol-%, more preferably at least 75 mol-%, even more preferably, at least 95 mol-%, and a diol component comprising at least 65% mol-% ethylene glycol, preferably at least 70 mol-%, more preferably at least 75 mol-%, even more preferably at least 95 mol-%. It is also preferable that the diacid component is terephthalic acid and the diol component is ethylene glycol, thereby forming polyethylene terephthalate (PET). The mole percent for all the diacid component totals 100 mol-%, and the mole percentage for all the diol component totals 100 mol-%.

Where the polyester components are modified by one or more diol components other than ethylene glycol, suitable diol components of the described polyester may be selected from 1,4-cyclohexandedimethanol, 1,2-propanediol, 1,4-butanediol, 2,2-dimethyl-1,3-propanediol, 2-methyl-1,3-propanediol (2MPDO), 1,6-hexanediol, 1,2-cyclohexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol, or mixtures of these, and the like. In general, these diols contain 2 to 18, preferably 2 to 8 carbon atoms. Cycloaliphatic diols can be employed in their cis or trans configuration, or as a mixture of both forms. Preferred modifying diol components are 1,4-cyclohexanedimethanol or diethylene glycol, or a mixture of these.

Where the polyester components are modified by one or more acid components other than terephthalic acid, the suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, bibenzoic acid, or mixtures of these and the like. In the polymer preparation, it is often preferable to use a functional acid derivative thereof such as the dimethyl, diethyl, or dipropyl ester of the dicarboxylic acid. The anhydrides or acid halides of these acids also may be employed where practical. These acid modifiers generally retard the crystallization rate compared to terephthalic acid. Most preferred is the copolymer of PET and isophthalic acid. Generally the isophthalic acid is present from about 1 to about 10 mole %, and preferably about 1.5 to 6 mole % of the copolymer.

Also particularly contemplated by the present invention is a modified polyester made by reacting at least 85 mol-% terephthalate from either terephthalic acid or dimethylterephthalate with any of the above comonomers.

In addition to polyester made from terephthalic acid (or dimethyl terephthalate) and ethylene glycol, or a modified polyester as stated above, the present invention also includes the use of 100% of an aromatic diacid such as 2,6-naphthalene dicarboxylic acid or bibenzoic acid, or their diesters, and a modified polyester made by reacting at least 85 mol-% of the dicarboxylate from these aromatic diacids/diesters with any of the above comonomers.

Suitable oxidizable organic polymers are polymer molecules containing allylic positions such as polybutadiene based polymers or polyethylene/cyclohexene copolymers, or containing benzylic positions such as m-xylylamine-based polyamides, or mixtures of these.

Preferably the oxidizable organic polymer is selected from the group of partially aromatic polyamides is which the amide linkage contains at least one aromatic ring and a non-aromatic species. Preferred partially aromatic polyamides include: poly(m-xylylene adipamide); poly(hexamethylene isophthalamide); poly(hexamethylene adipamide-co-isophthalamide); poly(hexamethylene adipamide-co-terephthalamide); poly(hexamethylene isophthalamide-co-terephthalamide); or mixtures of two or more of these. The most preferred is poly(m-xylylene adipamide) otherwise known commercially as MXD6.

The preferred range of oxidizable organic polyamide is 1 to 10% by weight of the composition depending on the required gas barrier required for the container.

In combination with the polymeric component and the oxidizable organic polymer, the composition of the present invention includes a transition metal compound as the catalyst, thus creating an oxygen scavenging blend after melt blending. The catalyst makes the blend an "active" oxygen scavenging polymeric blend. The transition metal catalyst can be a salt which includes a metal selected from the first, second, or third transition series of the Periodic Table. The metal preferably is Rh, Ru, or one of the elements in the series of Sc to Zn (i.e., Sc, Ti, V, Cr, Mn, Fe, Co, Ni, Cu, and Zn), more preferably at least one of Mn, Fe, Co, Ni, and Cu, and most preferably Co. Suitable anions for such salts include, but are not limited to, chloride, acetate, octoate, oleate, stearate, palmitate, 2-ethylhexanoate, neodecanoate, and naphthenate. The preferred amount of the transition metal catalyst is in the range of about 25 to about 300 ppm by weight, based on the polymer blend.

In the case where the oxygen scavenging polymer is incompatible with the base polymer, an ionic compatibilizer can be used to reduce the domain size of the oxidizable organic polymer, thus reducing the haze of the article. The ionic compatibilizer is preferably a copolyester containing a metal sulfonate salt group. The metal ion of the sulfonate salt may be $Na+$, $Li+$, $K+$, $Zn++$, $Mn++$, $Ca++$ and the like. The sulfonate salt group is attached to an aromatic acid nucleus such as a benzene, naphthalene, diphenyl, oxydiphenyl, sulfonyldiphenyl, or methylenediphenyl nucleus.

Preferably, the aromatic acid nucleus is sulfophthalic acid, sulfoterephthalic acid, sulfoisophthalic acid, 4-sulfonaphthalene-2,7-dicarboxylic acid, and their esters. Most preferably, the sulfomonomer is 5-sodiumsulfoisophthalic acid or 5-zincsulfoisophthalic acid, and most preferably their dialkyl esters such as the dimethyl ester (SIM) and glycol ester (SIPEG). The preferred range of 5-sodiumsulfoisophthalic or 5-zincsulfoisophthalic acid to reduce the haze of the article is 0.1 to 2.0 mol-% of the blend or composition.

Although not required, additives may be used in the base polymer/oxidizable organic polymer blend. Conventional known additives include, but are not limited to an additive of a filler, branching agent, reheat agent, anti-blocking agent, antioxidant, anti-static agent, biocide, blowing agent, coupling agent, flame retardant, heat stabilizer, impact modifier, UV and visible light stabilizer, crystallization aid, lubricant, plasticizer, processing aid, acetaldehyde and other scavengers, and slip agent, or a mixture thereof. As in the case of the colorant, these additives must be chosen not to deactivate the transition metal catalyst.

The melt blend of base polymer, oxidizable organic polymer, transition metal catalyst (and optionally an ionic compatibilizer) is conveniently prepared by adding the components at the throat of the injection molding machine that: (i) produces a preform that can be stretch blow molded into the shape of the container, (ii) produces a film that can be oriented into a packaging film, (iii) produces a sheet that can be thermoformed into a food tray, or (iv) produces an injection molded container. The mixing section of the extruder should be of a design to produce a homogeneous blend.

These process steps work well for forming carbonated soft drink, water or beer bottles, packaging films and thermoformed trays. The present invention can be employed in any of the conventional known processes for producing a polymeric container, film or tray.

After considerable research, it has been found that certain colorants bind with the transition metal catalyst after melt blending and thereafter. Each transition metal catalyst has an ion capable of reacting with compounds that may form a more stable compound. Although not bound by theory, it is thought that this binding of the transition metal catalyst ion to certain dyestuffs prevents the transition metal catalyst from acting as a catalyst for the oxidation of the oxidizable polymer.

Transition metals are unique in that the electronic configuration of the elements is characterized by having full outer orbitals and the second outermost orbitals incompletely filled. This allows the transition metals to form a formidable number of oxidation states, and the ease of moving from one valence state to another is believed to be the reason that they catalyze the oxidation of oxidizable polymers. It is well known that transition metals ions can bind ligands to give a coordination compound or complex. It is believed that certain colorants have ligands that will form such coordination compounds with the transition metal ion.

Proof of such binding with colorants was shown using X-ray Photoelectron Spectroscopy (XPS). The binding energy of the transition metal ion in the presence of a colorant that did not deactivate the oxidation catalytic behavior of the transition metal did not change, whereas in the presence of a colorant that did deactivate the oxidative catalytic behavior of the transition metal, the binding energy of the ion increased by 1 to 2 electron volts. This indicates that the transition metal ion, in the presence of a colorant that deactivates the oxidation of an oxidizable polymer, is being bound to the colorant.

Testing Procedures

1. Oxygen and Permeability

Oxygen flux of film samples, at zero percent relative humidity, at one atmosphere pressure, and at 23° C. was measured with a Mocon Ox-Tran model 2/21 (MOCON Minneapolis, Minn.). A mixture of 98% nitrogen with 2% hydrogen was used as the carrier gas, and 100% oxygen was used as the test gas. Prior to testing, specimens were conditioned in nitrogen inside the unit for a minimum of twenty-four hours to remove traces of atmospheric oxygen dissolved in the PET matrix. The conditioning was continued until a steady base line was obtained where the oxygen flux changed by less than one percent for a thirty-minute cycle. Subsequently, oxygen was introduced to the test cell. The reduction in the amount of oxygen was measured from 0 to 50 hours. Treatment of the data generated an Apparent Permeation Coefficient (APC), as a function of time with oxygen exposure $(cc(\text{STP}) \cdot cm)/(m^2 \cdot atm \cdot day)$, these units normalize the permeance through measurement of the film thickness. The generated APC data is not a steady state value in normal permeation coefficients. APC is data generated that describes oxygen permeation at a fixed point in time, even though this coefficient is changing slowly with time. These changes are too small to be detected during the time necessary for measuring their value at any fixed point in time. Calculation of the oxygen permeability was done according to a literature method for permeation coefficients for polymers, from Fick's second law of diffusion with appropriate boundary conditions. The literature documents are: Sekelik et al., *Journal of Polymer Science Part B: Polymer Physics*, 1999, Volume 37, Pages 847-857. The second literature document is Qureshi et al., *Journal of Polymer Science Part B: Polymer Physics*, 2000, Volume 38, Pages 1679-1686. The third literature document is Polyakova, et al., *Journal of Polymer Science Part B: Polymer Physics*, 2001, Volume 39, Pages 1889-1899.

All film permeability values are reported in units of $(cc(\text{STP}) \cdot cm)/(m^2 \cdot atm \cdot day)$. The Catalyst Deactivation Factor (CDF) is defined as:

(oxygen permeability of base polymer, oxidizable organic polymer, transition metal catalyst and 0.25 weight % colorant)/(oxygen permeability of base polymer and oxidizable organic polymer).

A CDF of 1 corresponds to complete deactivation, and a CDF of 0 corresponds to no deactivation of the oxidation catalyst.

2. XPS Analysis

A 200 ppm solution of the transition salt and approximately 1% by weight of the colorant was prepared in 5 gm of trifluoroacetic acid. The solution was shaken to achieve a homogeneous solution.

This homogeneous solution obtained above was spin coated on a glass slide 1×1 cm in size. The volume of the solution used for coating was approx. 100 μl. The spin coater used for the purpose of coating was from Speedline Technologies Model 6708D. The glass slide was placed on the rotating disk and the solution was dropped after the glass slide was rotating at a constant speed of 1200 rpm. It was allowed to rotate further at the same speed of 1200 rpm for another 30 seconds followed by ramping the speed to 1500 rpm in 2 seconds and rotating at that speed for 10 seconds. Thereafter the rotating disk was brought to stop in 6 seconds. The spin coated samples were placed under vacuum at 50-60° C. for 6-8 hours for the removal of solvent. The glass slide containing the transition metal salt and colorant were analyzed by XPS.

The XPS instrument used was a Perkin Elmer ESCA and conditions were: Pass Energy—93eV, Chamber Pressure—$10^{-8}$ Torr with an irradiation electrode of A1 Kα (1486.6 eV). Fifty scans in the range of the binding energy of the transition metal were taken and averaged.

Example 1

A commercial PET bottle resin T2201 (INVISTA Spartanburg, S.C. USA) was used as a base resin, blended with a sodium 5-sulfoisophthalic acid copolyester to give 0.11 mole % sulfoisophthalic acid. The oxidizable organic polymer was Type 6007 poly(m-xylylene adipamide) (MXD6) from Mitsubishi Gas Chemical, Tokyo Japan at a concentration of 5 weight %, based on the weight of the total blend. The transition metal was cobalt stearate at a level of 60 ppm cobalt, based on the weight of the total blend. This blend of base resin, MXD6, and cobalt stearate was melt blended with various colorants at a concentration of 0.25 weight %, based on the weight of the blend, and injection molded into preforms. These preforms were stretch blow molded into standard 0.6 liter bottles. The oxygen permeability of the bottle sidewall was measured after 50 hours and compared to a permeability of 0.133 and 0.0004 (cc(STP)·cm)/(m²·atm·day) for the PET control with 5 wt-% MXD6, and the PET—MXD6 with a transition metal salt (60 ppm Co), both without a colorant, respectively. The results using colorants from various suppliers and various types are set forth in Table 1.

TABLE 1

| Color Index | Colorant Type | Permeability (CC(STP)·cm)/ (m²·atm·day) | CDF |
|---|---|---|---|
| | None | 0.000 | 0 |
| Solvent Yellow 114 | Quinoline dye | 0.000 | 0.000 |
| Solvent Red 195 | Azo dye | 0.002 | 0.015 |
| Solvent Blue 97 | Anthraquinone dye | 0.002 | 0.017 |
| Solvent Yellow 114 | Quinophthalone dye | 0.005 | 0.038 |
| Solvent Red 179 | Perinone dye | 0.008 | 0.058 |
| Solvent Red 135 | Perinone dye | 0.050 | 0.374 |
| Solvent Brown 53 | Azomethine dye | 0.056 | 0.421 |
| Solvent Yellow 93 | Methine dye | 0.057 | 0.431 |
| Pigment Blue 15:3 | Phthalocyanine pigment | 0.106 | 0.797 |
| Solvent Green 3 | Anthraquinone dye | 0.133 | 1.000 |
| Solvent Blue 67 | Phthalocyanine pigment | 0.133 | 1.000 |

As this table illustrates, there is no correlation of the CDF with the (chemical) type of colorant. For instance, an anthraquinone blue dye has a CDF of 0.017 whereas an anthraquinone green colorant had a CDF of 1.00. A colorant with a CDF of less than about 0.25 is within the scope of the present invention.

Example 2

Solutions of cobalt acetate tetrahydrate (control), with Solvent Red 195 and with Solvent Green 3 were prepared and analyzed by XPS as discussed above. The $2p_{3/2}$ binding energy of cobalt metal is 778.1 eV (*CRC Handbook of Chemistry and Physics*, 81$^{st}$ Edition). The binding energy of the control Co(II) oxidation state was measured to be 780.8 eV, and in the presence of Solvent Red 195 (CDF of 0.014) remained at 780.8 eV, while in the presence of Solvent Green 3 (CDF of 0.899) the binding energy increased to 783.2 eV.

This analysis shows that a colorant that deactivates the transition metal catalyst in the oxidation of an oxidizable polymer exhibits a coordination bond with the transition metal ion.

Although particular embodiments of the invention have been described in detail, it will be understood that the invention is not limited correspondingly in scope, but includes all changes and modifications coming within the spirit and terms of the claims appended hereto.

What is claimed is:

1. A melt blended resin for packaging articles comprising: a base polymer, oxidizable organic polymer, transition metal catalyst, and a colorant, such that an article made from said melt blended resin has a catalyst deactivation factor of less than 0.25, and further wherein said base polymer is selected from the group consisting of polyethylene, polyester, polyvinyl chloride, polyvinylidene chloride, ethylene copolymers, and blends thereof.

2. The melt blended resin of claim 1, wherein said colorant does not increase the binding energy of the transition metal catalyst ion by more than 1 eV.

3. The melt blended resin of claim 1, wherein said base polymer is polyester.

4. The melt blended resin of claim 3, wherein said polyester is a copolyester of polyethylene terephthalate.

5. The melt blended resin of claim 1, wherein said oxidixable organic polymer is a partially aromatic polyamide.

6. The melt blended resin of claim 5, wherein said partially aromatic polyamide is MXD6.

7. The melt blended resin of claim 1, wherein said oxidizable organic polymer is polybutadiene.

8. The melt blended resin of claim 1, wherein said transition metal catalyst is a cobalt salt.

9. The melt blended resin of claim 8, wherein said cobalt salt is cobalt stearate.

10. The melt blended resin of claim 1, wherein said resin contains an ionic compatibilizer, wherein the ionic compatibilizer reduces the haze of the packaging articles.

11. The melt blended resin of claim 10, wherein said compatibilizer is a copolyester containing a metal sulfonate salt.

12. The melt blended resin of claim 11, wherein said metal sulfonate salt is 5-sodiumsulfoisophthalic acid.

13. A monolayer film, having an oxygen permeation rate of less than 0.01 (cc(stp)·cm)/(m2·atm·day), said film formed from a melt blend of a base polymer, oxidizable organic polymer, transition metal catalyst, and a colorant, wherein said base polymer is selected from the group consisting of polyethylene, polyester, polyvinyl chloride, polyvinylidene chloride, ethylene copolymers, and blends thereof.

14. A polymer blend for packaging articles comprising: a melt blend of a base polymer, oxidizable organic polymer, transition metal catalyst, and a colorant, such that said blend does not increase the binding energy of the transition metal catalyst ion by more than 1 eV, and further wherein said base polymer is selected from the group consisting of polyethylene, polyester, polyvinyl chloride, polyvinylidene chloride, ethylene copolymers, and blends thereof.

15. The polymer blend of claim 14, wherein said blend has a catalyst deactivation factor of less than about 0.25.

* * * * *